Jan. 6, 1942.   A. SCHWARZ   2,269,131
DETONATION SUPPRESSOR FOR INTERNAL COMBUSTION ENGINES
Filed March 4, 1939    2 Sheets-Sheet 1
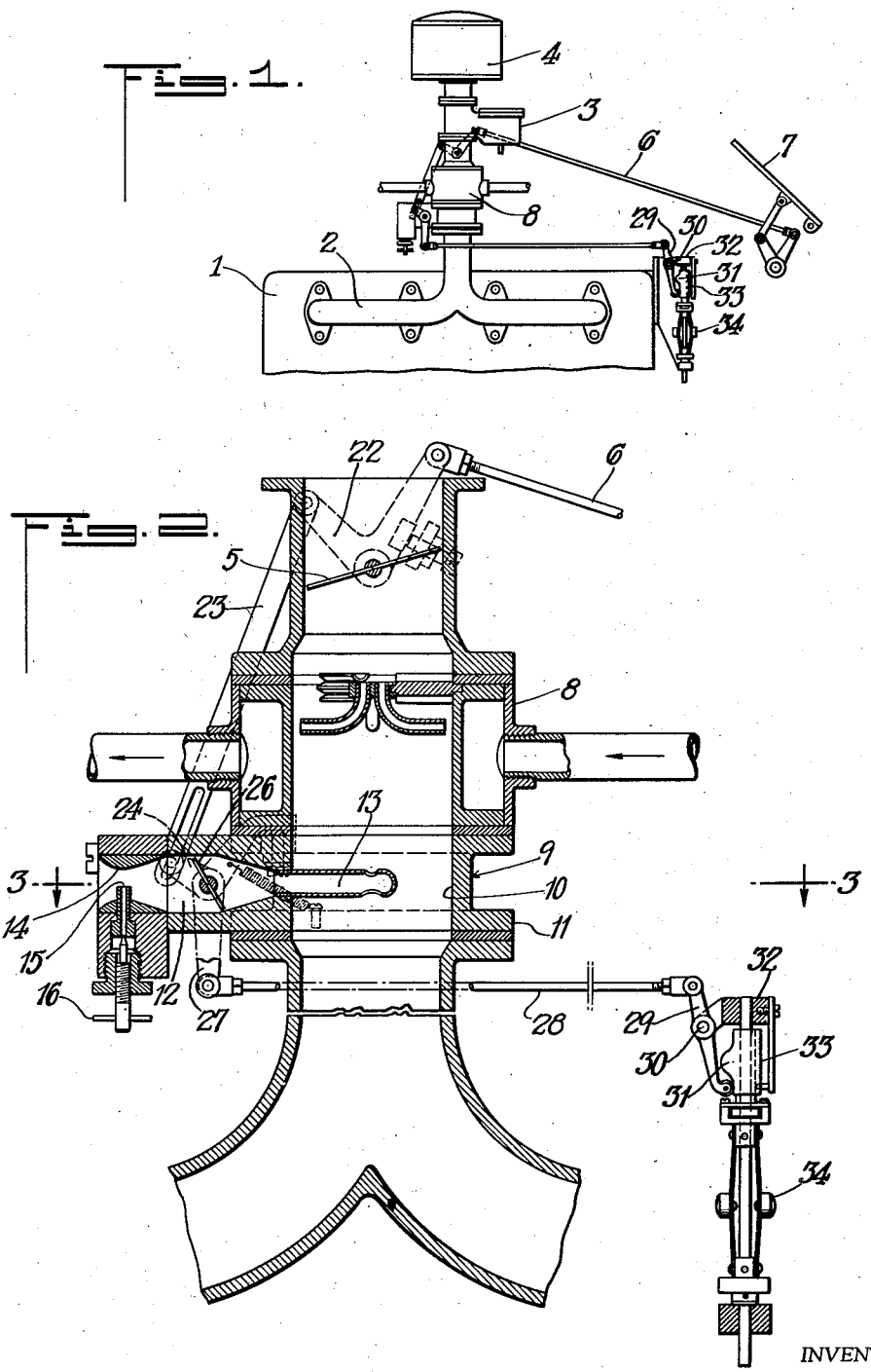
INVENTOR.
ALFRED SCHWARZ.
BY
ATTORNEYS Jan. 6, 1942.  A. SCHWARZ  2,269,131
DETONATION SUPPRESSOR FOR INTERNAL COMBUSTION ENGINES
Filed March 4, 1939  2 Sheets-Sheet 2
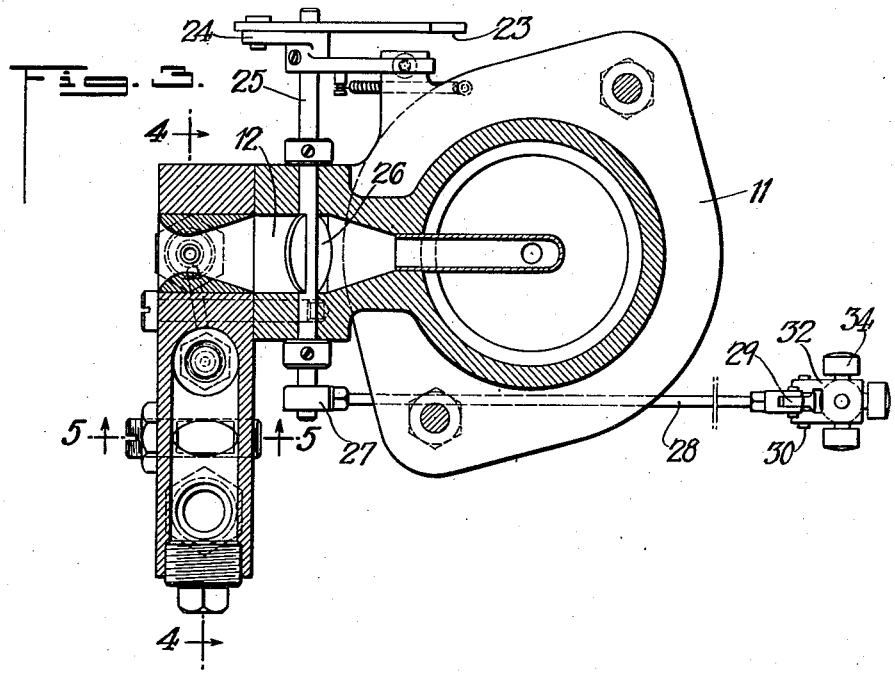
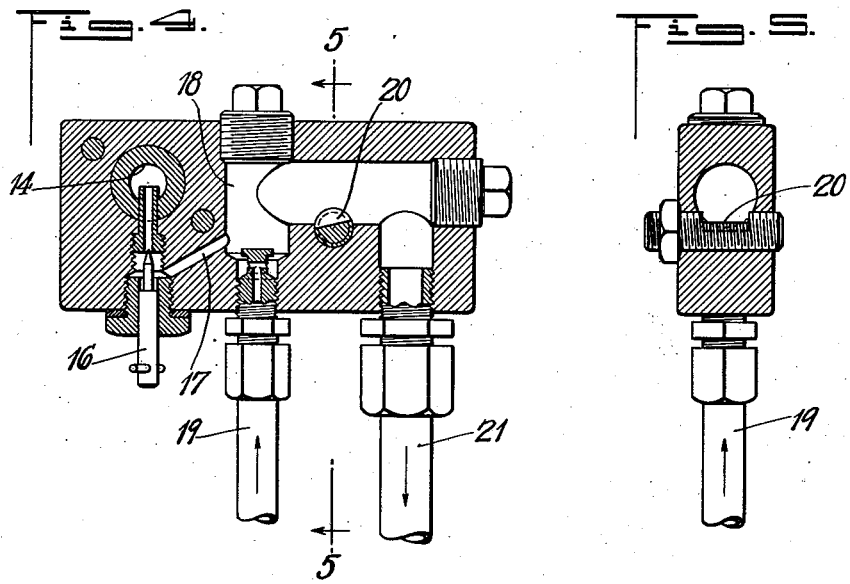
INVENTOR.
ALFRED SCHWARZ.
BY
ATTORNEYS Patented Jan. 6, 1942

2,269,131

UNITED STATES PATENT OFFICE 2,269,131

DETONATION SUPPRESSOR FOR INTERNAL COMBUSTION ENGINES

Alfred Schwarz, Ridgewood, N. J., assignor to Automotive Economy Corporation, Jersey City, N. J., a corporation of Delaware Application March 4, 1939, Serial No. 259,803

8 Claims. (Cl. 123—198)

The present invention relates to the suppression of detonation in an internal combustion engine. The invention has been usefully applied by the conditioning of air, fed to an internal combustion engine, particularly with reference to its moisture content and its combustion qualities.

Heretofore, air fed into internal combustion engines was assumed to have the same quality in all cases. However, it has been observed by many that the engine performs differently on different days and at different times, particularly at night time a better performance was observed. This is due to the moisture content of the air. Such moisture content may be too much or too little, and, furthermore, when the moisture content is high enough to suppress detonation, it is too high for proper burning speed.

I have found that alcohol not only has similar detonation suppressing qualities to water, but it also has a fuel value and when mixed with water it has an effect of causing an intimate flame contact.

Since the fuel requires some latent heat of vaporization for good distribution, and some of the components of the fuel have boiling points up to 400° F., it is not desirable to starve the fuel for heat, although such heat supply should be moderate. The alcohol and water, however, if not 100% vaporized, would not show results very detrimental to the engine operation. Such alcohol and water should not be supplied in a heated condition, or, in other words, already having absorbed the latent heat of vaporization but it should be supplied reasonably cool, say about 60° F., so that it may absorb any excess heat left over from the vaporization of the main engine fuel such as gasoline.

I, therefore, supply the alcohol and water at the point where the gasoline has already absorbed its latent heat of vaporization which has the effect of high volumetric efficiencies and there is always heat available in the cylinder itself from the residual gases.

It is, of course, understood that I may abstract excess moisture by the usual baffle methods or in any other suitable manner in the event that excess moisture is already contained in the air, or, I may vary the strength of the alcohol-water solution to meet such conditions.

I have found that the suppression of detonation is accomplished by a number of chemical and physical actions. The fuel itself may be of a nature causing relatively slow flame propagation, and/or retardants may be used such as the well-known tetra-ethyl lead and others.

The above represents the chemical type of detonation suppressor and there may be also used what I might term a physical type of detonation suppressor, whereby use is made of the latent heat of vaporization to absorb a portion of the heat radiated and conducted by the engine into the incoming charge and also the reduction of the temperature of the charge which may be caused by residual gases not scavenged from the motor.

In a previous patent application, Serial No. 219,535, filed July 16, 1938, for Process and apparatus for charging internal combustion engines, I have described means to regulate the intake temperature of the motor and also means of introducing secondary anti-detonating fuels to suppress detonation, and I have also described the results of the use of such fuels which manifest themselves by maximum torque and horsepower output of the engine when properly used.

In my copending application Ser. No. 259,806, executed on March 2, 1939, and filed on even date herewith, I have described a device using a primary fuel-air mixture and a secondary fuel mixed with air, and in which such secondary fuel is used mainly as a detonation suppressor. Said application describes the benefits obtained from physical and chemical properties of said detonation suppressor.

An object of this invention is to provide a detonation suppressor having the desired characteristics above referred to and a method of using the same to produce improved efficiency and economy of operation of an internal combustion engine.

Further objects and advantages of the invention will more fully appear from the following description taken in connection with the accompanying drawings which show, by way of example, suitable apparatus for carrying out the method.

In the drawings:

Fig. 1 is a somewhat diagrammatic view showing the general arrangement of the apparatus relative to an internal combustion engine;

Fig. 2 is a vertical sectional view taken through a part of the apparatus and showing certain details of the detonation suppressor feeding mechanism;

Fig. 3 is a horizontal sectional view taken at 3—3 of Fig. 2;

Fig. 4 is a vertical sectional view taken at 4—4 of Fig. 3; and

Fig. 5 is a vertical sectional view taken at 5—5 of Fig. 4.

The present invention is a continuation in part of certain subject matter of said copending application and is based upon correlating facts described in the two patent applications hereinbefore mentioned. One of the outstanding features of the present invention resides in the fact that I have found the B. t. u. value of the fuel and its anti-detonating value must be carefully balanced if maximum efficiency is to be accomplished. This is a critical proportion which may not be neglected, particularly if the anti-detonator has any fuel value whatesoever. For example: tetra-ethyl lead has substantially no fuel value and varying proportions added to the fuel can be so gauged as to slow down the flame propagation of a given fuel permitting maximum compression pressures and optimum spark setting. Other detonation suppressors, however, such as alcohol, have a fuel value. Ethyl alcohol has a fuel value of 12,000 B. t. u. per pound, and gasoline a fuel value of approximately 18,000 B. t. u. per pound. For numerous reasons, it is not practical to use a mixture of alcohol and gasoline, and it is, therefore, desirable to use the alcohol only within the detonation ranges which has been described in the two other patent applications mentioned.

I have found that the detonation suppressing quality of alcohol can be increased by diluting the alcohol with varying quantities of water. Such a mixture is partially a physical and partially a chemical detonation suppressor, as I have referred to previously in this application.

When alcohol or dilute-alcohol is added, there still exists, however, a B. t. u. value which must be carefully balanced with the primary fuel; otherwise a lean or over-rich mixture may cause a power loss. I may use for example: 25% alcohol and 75% water. In this case, there is a fuel value of about 3,000 B. t. u. per pound of this mixture supplied. If the engine has its best power with a fuel supply of say ½ pound of gasoline per horsepower hour, there would then be consumed, 9,000 B. t. u. per hour. If the above alcohol mixture was added without deducting proportionate amounts of gasoline, the engine would be supplied with 12,000 B. t. u. per horsepower hour which would cause an over-rich mixture and consequently a power loss, with poor economy.

It must first be determined what the octane requirements of a given engine should be for best performance. For example: An engine with a compression ratio of seven to one may require a fuel mixture equivalent to 85 octane. It can be experimentally determined with reference fuels just what the octane number should be. It can also be determined with an alcohol water mixture of a given strength what the octane value of such a mixture, when added to a given octane rated fuel is, by varying the quantity of this fuel and reading the instrument on the dynamometer; also, it must be carefully noted whether the addition of water causes a correct or incorrect retarding action. This is simply determined by adding water and until the power drops. The addition of the water, of course, must be in the form of dilution of the alcohol, and after it is determined that a certain amount of dilute-alcohol gives the desired octane effect, the B. t. u. value of this mixture must be checked together with the primary fuel to ascertain that the engine is receiving the proper B. t. u. per horsepower hour.

To find the proper quantity of both fuels supplied, it is best to determine the unburned fuel in the exhaust by the use of one of many suitable exhaust gas analyzers. I prefer to do this on a dynamometer where power, fuel consumption, and exhaust analyses can be read accurately. It may be done, however, on a vehicle operated under comparable loads by the use of a stopwatch and a gas analyzer, simply determining the time in which the vehicle negotiates a given grade and regulating the fuel supply to the best fuel reading (quantitatively).

I have found that when sufficient water only is added into the intake of the motor to suppress a given degree of detonation, there is a substantial power loss incurred but when said water is mixed with a percentage of alcohol and the fuel value of that percentage of alcohol is properly balanced with the motor requirements, then a gain of horsepower is incurred.

For economical reasons, of course, alcohol should be used as sparingly as possible on account of its expense, and it is, of course, understood that an alcohol-water mixture must be atomized and mixed with the fuel in its vapor form as dilute-alcohol and gasoline, for example, are not miscible in each other. The apparatus for the introduction of secondary fuels by separate atomization has been described fully in the two patent applications previously mentioned.

The general principle herein disclosed must be applied and the critical proportions must be maintained no matter what the secondary fuel might be, it being understood, that anti-detonating fuels are generally more expensive and my previous patent applications were directed towards the use of such fuels only when needed, in order to minimize the expense. The present invention is also carried out for reasons of economy in the same manner. However, when mixtures are used, not miscible in the main fuel, it becomes necessary to supply them separately for physical reasons.

Another example of the necessity of maintaining the critical proportions of the two fuels may be seen when iso-octane is used. It has substantially the same fuel value as gasoline. (The cost, of course, is higher.) While it is entirely feasible to mix it with the main gasoline supply, for economical reasons, of course, it should be supplied separately at detonation periods only, but at the time when such separate supply occurs the main fuel supply must be reduced, or the engine may be operated during throttle periods and the secondary fuel may be added together with more main fuel when maximum torque is required.

I am aware of the fact that it has been proposed to use what might be termed a dual-carburetor; one, having the high octane fuel supply and the other, the low octane fuel supply. Each of them mixes the charge with the air supply and one of them is cut down by throttle means while the other one is increased by another throttle means. This, however, is not the equivalent of the present invention, because the more expensive fuel is used more and more with increasing throttle openings until finally the expensive fuel is used entirely at wide open throttle, whereas, the present invention contemplates using an anti-detonator only for brief periods and maintaining the main supply of fuel of the cheapest possible grade for the majority of time and, in addition thereto, the present invention contemplates to use the relatively high latent heat of vaporization required by water without intercepting the flame propagation by totally uncombustible water vapor. This is accomplished by atomizing with the water relatively small quantities of alcohol and may also be accomplished by the use of water miscible combustible such as acetone, etc. The present invention also contemplates to add anti-corrosive substances such as oils and ketones either by mixing same directly with the secondary fuel or spraying minute quantities of the same into the intake mechanism of the engine.

The present invention must not be confused with any method where water and/or alcohol is evaporated by heat and then supplied to the intake of the engine. It must be borne in mind that the present invention makes use of the absorption of excess temperatures in the intake mechanism and cylinders by utilizing the latent heat of vaporization which would be already incorporated if vapors were used as hereinbefore described.

The present invention also contemplates the use of chemicals in the water mixed with alcohol such as for instance: ammonium nitrate and others, this for the purpose of setting free oxygen whenever desired, and I may use sugar, etc., to increase the fuel value.

In other words, the invention makes possible the use of water soluble combustibles.

With reference to water alcohol mixtures or mixtures of other carbo-hydrates with water, I have found that approximately 25% of alcohol plus 75% of water are the best proportions for economical reasons as well as for best engine performance, other combustibles may be added in accordance with their fuel value.

It is, of course, understood that in order to obtain maximum results the compression pressures and spark settings must be correlated to the anti-detonating value of the fuel. This, however, is well understood by those versed in the art.

As an anti-knock fluid, I may use alcohol and water in suitable proportion. For example: 30% of alcohol and 70% water. I may also use acetone in similar proportions.

Apparatus

The apparatus to be described following has been disclosed in my said copending applications Ser. No. 219,535 and Ser. No. 259,806 and certain features thereof will be described following in conjunction with the annexed drawings illustrating a suitable means for carrying out the method of this invention.

Referring more particularly to Figs. 1 and 2: the engine 1 is supplied with the usual intake manifold 2, which has an outwardly extending intake branch in communication with a down draft carburetor 3 which may be equipped with the usual air cleaner 4. The usual butterfly valve throttle 5 is actuated by throttle control mechanism designated as 6 and in the present embodiment actuated from the accelerator foot pedal 7. The heating unit 8 is preferably utilized in the manner and for the reasons more particularly referred to in my said copending application Ser. No. 259,806. Interposed between the heating unit 8 and the intake manifold 2 is a unit for introducing said dilute alcohol or the like mixture into the intake system. This unit comprises a body member provided with a cylindrical bore 10 formed as a part of the intake branch of the manifold 2, and the body is provided with suitable flanges such as 11 serving to secure it in position. A transverse passage 12 has a cylindrical intermediate portion and its inner end is reduced in size and is provided with a tube 13 extending within the bore 10 and provided with suitable openings for emitting the anti-knock mixture into the intake system. The outer end of the bore is provided with a Venturi throat 14 into which extends a nozzle 15 provided with a suitable needle valve 16 for adjusting the flow of fluid through said nozzle into the venturi.

Referring to Figs. 3, 4 and 5: it will be seen that the nozzle 15 is in communication with one end of a channel 17, whose other end communicates with a reservoir 18 which may be provided with fluid, such as the water-alcohol mixture, through the pipe 19 supplying said fluid from a suitable tank, either by means of gravity or a pump in the customary manner. The level of the fluid in the reservoir 18 may be accurately controlled by the adjustable weir 20, and the overflow passing over said weir is taken back to the supply tank as by a pipe 21.

Referring more particularly to Figs. 2 and 3: it will be seen that the throttle control 6 is connected to the main throttle valve 5 by means of a bell crank 22 which is also connected to the upper end of a link 23, whose lower end is connected by means of a slot and pin connection to an arm 24 fixed to a shaft 25 carrying a butterfly valve 26 disposed within the transverse intake passage 12; the parts being so arranged that on the predetermined positions of the throttle valve 5 the valve 26 is given the desired opening. The other end of the valve rod 25 carries secured thereto a crank arm 27, which is connected by means of a rod 28 to one end of a cam arm 29, pivoted at 30, and whose other end carries a suitable cam follower in operative engagement with a cam 31 slidably journaled on governor spindle 32 by a spline or sliding connection designated as 33. The cam 31 is actuated in a vertical direction by means of a suitable governor mechanism such as 34 in such manner that the governor is freely rotatable so as to perform its usual functions while at the same time carrying with it upwardly and downwardly the cam 31 and the governor is operatively connected with the engine crank shaft in any suitable manner. Accordingly, as the engine speed varies, the governor causes the cam 31 to reciprocate in accordance with the engine speed.

The surface of the cam 31 is plotted in accordance with the predetermined engine characteristics so as to move the valve 26 in the desired position in accordance with the method previously described. Taking for purposes of illustration an engine having a maximum R. P. M. of 3600 and assuming that the normal period of detonation of said engine in the use of a given primary fuel commences at 800 R. P. M., reaches a maximum intensity of detonation at 2000 R. P. M., and ceases to detonate at 2500 R. P. M.: the cam 31 and associated mechanism will be so proportioned and arranged that the valve 26 will commence to open at 800 R. P. M., and will continue to open until the speed of 2200 R. P. M. has been reached, and will then start to close at increasing speeds where detonation gradually subsides and will be closed when there is no tendency to detonate. The slotted connection on the end of the link 23 is arranged to provide for the speed control of the valve 26 without interference from this link connection to the usual throttle control 6, but the slotted connection is so arranged that if the throttle mechanism 6 should be quickly actuated as by a full depression of the pedal 7, the connecting link 23 will serve to impart a limited opening movement immediately to the valve 26 at nearly open throttle. From the foregoing it will be seen that as the accelerator pedal 7 is depressed to open the throttle valve 5, the engine speed is increased and this increase in engine speed correspondingly opens the valve 26 to permit the passage of atomized dilute alcohol-water mixture or the like mixture into the intake system, where it is intermingled with the primary fuel mixture to automatically effect the desired results as above more fully described.

What I claim is:

1. The method of suppressing detonation in an internal combustion engine subject to normal periods of detonation in the use of a primary fuel which comprises, supplying to the intake of said engine in conjunction with an atomized primary fuel mixture a relatively small amount of a water miscible combustible carbohydrate admixed with a relatively large amount of water during said normal detonation periods and controlling the amount of said water-carbohydrate mixture so supplied in proportion to the primary fuel consumed during said periods in accordance with the octane values respectively of said water-carbohydrate mixture and said primary fuel mixture so as to provide a combined total fuel value commensurate with the required octane and fuel requirements of said engine for its maximum detonation-free performance.

2. The method of suppressing detonation in an internal combustion engine subject to normal periods of detonation in the use of a primary fuel which comprises, supplying to the intake of said engine in conjunction with an atomized primary fuel mixture a relatively small amount of alcohol admixed with a relatively large amount of water during said normal detonation periods, said mixture containing at least 25% of alcohol, and controlling the amount of said mixture so supplied in proportion to the primary fuel consumed during said periods substantially in accordance with the octane and B. t. u. values of said mixture and said primary fuel mixture respectively so as to provide a combined total fuel value commensurate with the required octane and B. t. u. requirements of said engine for its maximum detonation-free performance.

3. The method of suppressing detonation in an internal combustion engine subject to normal periods of detonation in the use of a primary fuel which comprises, supplying to the intake of said engine in conjunction with an atomized primary fuel mixture a relatively small amount of alcohol admixed with a relatively large amount of water during said normal detonation periods and controlling the amount of said water-alcohol mixture so supplied in proportion to the primary fuel consumed during said periods substantially in accordance with the octane values respectively of said water-alcohol mixture and said primary fuel mixture so as to provide a combined total fuel value commensurate with the required octane and fuel requirements of said engine for its maximum detonation-free performance.

4. The method of suppressing detonation in an internal combustion engine subject to normal periods of detonation in the use of a primary fuel which comprises, supplying to the intake of said engine in conjunction with an atomized primary fuel mixture a relatively small amount of a water miscible combustible carbohydrate admixed with a relatively large amount of water containing a chemical capable of supporting combustion within the explosion chambers of said engine during said normal detonation periods and controlling the amount of said water-carbohydrate mixture so supplied in proportion to the primary fuel consumed during said periods in accordance with the respective octane values of said water-carbohydrate mixture and said primary fuel mixture so as to provide a combined total fuel value commensurate with the required octane and fuel requirements of said engine for its maximum detonation-free performance.

5. The method of suppressing detonation in an internal combustion engine subject to normal periods of detonation in the use of a primary fuel which comprises, supplying to the intake of said engine in conjunction with an atomized primary fuel mixture a relatively small amount of an aqueous mixture containing at least 25% of alcohol during said normal detonation periods and controlling the amount of said aqueous mixture so supplied in proportion to the primary fuel consumed during said periods in accordance with the octane values respectively of said aqueous mixture and said primary fuel mixture so as to provide a combined total fuel value commensurate with the required octane and fuel requirements of said engine for its maximum detonation-free performance.

6. The method of suppressing detonation in an internal combustion engine subject to normal periods of detonation in the use of a primary fuel which comprises, supplying to the intake of said engine in conjunction with an atomized primary fuel mixture a relatively small amount of alcohol admixed with a relatively large amount of water commencing after the throttle has been partially opened and the engine has attained a speed at which detonation with the primary fuel would occur and ceasing said introduction of water-alcohol mixture before the throttle is fully opened and within the approximate range of periods of substantial maximum filling and controlling the amount of said water-alcohol mixture so supplied in proportion to the primary fuel consumed during said periods substantially in accordance with the octane values respectively of said water-alcohol mixture and said primary fuel mixture so as to provide a combined total fuel value commensurate with the required octane and fuel requirements of said engine for its maximum detonation-free performance.

7. The method of suppressing detonation in an internal combustion engine subject to normal periods of detonation in the use of a primary fuel which comprises, subjecting a body of moving air to a spray of fluid comprising water and alcohol in proportions predetermined by engine characteristics and introducing the resulting mixture into a primary fuel mixture intake stream at predetermined periods in accordance with engine performance.

8. The method of suppressing detonation in an internal combustion, spark ignition engine which comprises, supplying to the intake of said engine an atomized primary mixture of fuel and air, adding to said primary mixture during the normal detonating periods of said engine a secondary atomized fuel mixture comprising a water miscible combustible carbohydrate admixed with water and air, and controlling the amount of said atomized water-carbohydrate mixture so supplied in correct proportion to the primary fuel mixture to suppress detonation, without loss of power or efficiency.

ALFRED SCHWARZ.